United States Patent Office 2,993,068
Patented July 18, 1961

2,993,068
1-AMINOMETHYL-1-AMINOCYCLOHEXANES
Edgar S. Schipper, Highland Park, N.J., assignor to Ethicon, Inc., a corporation of New Jersey
No Drawing. Filed July 1, 1958, Ser. No. 745,846
11 Claims. (Cl. 260—468)

This invention relates to a new series of organic compounds. More particularly, it concerns a new class of N-R-aminomethyl-cyclohexylamines, their acid addition salts, and methods for their preparation, R being hydrogen or a lower carbalkoxy substituent.

The novel compounds of this invention may be represented by the following general formula:

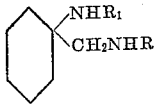

wherein R is hydrogen or a lower carbalkoxy group such as carbomethoxy, carbethoxy, carbopropoxy, carbobutoxy, carbopentoxy, carbisopentoxy, carbohexoxy. $R_1$ is hydrogen or a lower alkyl group such as methyl, ethyl, propyl, isopropyl, butyl, isobutyl, pentyl, isopentyl, hexyl; mononuclear aryl such as phenyl; aralkyl such as benzyl, beta-phenethyl, phenylpropyl, phenylbutyl, tolylmethyl, 2,6-xylidyl; or dialkylaminoalkyl such as dimethylaminomethyl, dimethylaminoethyl, dimethylaminopropyl, diethylaminomethyl, diethylaminoethyl, diethylaminopropyl and higher homologues thereof.

The compounds of this invention wherein the R substituent (supra) is hydrogen, i.e. the primary aminomethyl cyclohexylamines are useful as local anaesthetics and as intermediates for the preparation of the corresponding compounds wherein the R substituent is carbalkoxy, i.e. the secondary aminomethylcyclohexylamines. The latter are in themselves useful as local anaesthetics.

The primary aminomethylcyclohexylamines are prepared by reduction of the corresponding cyclohexylcarboxamides. Preferred reducing agents are the light metal hydrides such as lithium aluminum hydride, sodium aluminum hydride and magnesium hydride. If desired, the reduction may be carried out with any one of a variety of other reducing agents, for example catalytically activated hydrogen, e.g. hydrogen activated by a platinum, palladium or nickel catalyst such as platinum oxide or Raney nickel; hydrogen in statu nascendi, that is reduction with metals and acids such as iron, zinc or tin, for example zinc and acetic acid; with alkali metals and alcohols, e.g. sodium and ethanol or butanol; with sodium and moist ether; or with sodium or aluminum amalgam and the appropriate solvent.

Conversion of the primary aminomethylcyclohexylamines to the corresponding secondary amines is readily accomplished by reacting the former with an excess of a lower alkyl ester of carbonic acid, e.g. methyl carbonate, ethyl carbonate, propyl carbonate, butyl carbonate, etc., in the presence or, preferably, in the absence of an inert organic solvent such as toluene, ethylacetate, butylacetate, advantageously at a temperature equivalent to the boiling point of the reaction mixture, under reflux conditions.

The starting materials used in the preparation of the compounds of this invention are described in my copending application Serial No. 745,845, filed July 1, 1958, now abandoned, filed concurrently herewith. Briefly, these starting materials are obtained by hydrolysis of the corresponding nitriles with a strong mineral acid, e.g. sulfuric acid or hydrochloric acid. The nitriles in turn are prepared by treating cyclohexanone with an appropriate primary or secondary amine, or ammonia, in the presence of an alkali metal cyanide, e.g. potassium cyanide or sodium cyanide by a modified Strecker synthesis.

The novel primary and secondary aminomethylcyclohexylamines may be converted to their therapeutically useful acid addition salts by reaction with an appropriate acid, as for example an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroethanesulfonic, benzene sulfonic, p-toluene sulfonic, salicyclic, p-aminosalicylic, 2-phenoxy-benzoic or 2-acetoxy-benzoic acid.

Depending upon the conditions employed during the course of the reaction, the novel compounds are obtained either in the form of the free bases or salts thereof. The salts are converted to the free bases in the usual manner, e.g. by reaction with alkali such as sodium or potassium hydroxide. The bases can be converted to their therapeutically useful acid addition salts by reaction with an appropriate organic or inorganic acid (supra).

The novel primary and secondary aminomethylcyclohexylamines may be incorporated into suitable carriers either in the form of their bases or salts. The carrier may be either an organic or inorganic solid or liquid suitable for topical administration. Inert substances which are suitable as carriers are water, gelatin, starch, magnesium stearate, talc, vegetable oils, gases, polyalkylene glycols and numerous other substances well known to those skilled in the art for the formulation of topically administrable compositions, i.e. ointments, gels, vanishing creams, oil-in-water and water-in-oil emulsions.

The following examples are given to ilustrate, but not to limit, the scope of this invention.

*Example I*

To a cooled and stirred solution containing 100 parts by volume of concentrated sulfuric acid is added dropwise 30 parts by weight of 1-beta-diethylaminoethylaminocyclohexane carbonitrile. The mixture is heated on a steam bath for one hour and then poured into 1 kilogram of ice. The mixture is basified with concentrated ammonia, filtered and extracted with 1000 parts by volume of chloroform to give 1-beta-diethylaminoethylcyclohexane carboxamide which is recrystallized at −30° C. from pentane, melting point 69–70° C.

To a stirred suspension of 5.4 parts by weight of lithium aluminum hydride and 200 parts by volume of ether is added dropwise a solution containing 20 parts by weight of 1-beta-diethylaminoethylaminocyclohexane carboxamide and 100 parts by weight of 1-beta-diethylaminoethylaminocyclohexane carboxamide and 100 parts by volume of ether. The solution is allowed to extract in a Soxhlet apparatus for 18 hours, the excess reagent is neutralized and the 1-aminomethyl-1-beta-diethylaminoethyl-amino cyclohexane is distilled at 87–90° C./0.09 mm. The trihydrochloride, obtained in the usual manner, melts at 170–175° C.

*Example II*

To a cooled and stirred solution containing 100 parts by volume of concentrated sulfuric acid is added dropwise 30 parts by weight of 1-benzylamino cyclohexane carbonitrile. The mixture is heated on a steam bath for one hour and then poured into 1 kilogram of ice. The mixture is basified with concentrated ammonia, filtered, dried and recrystallized from 200 parts by volume of heptane to give 1-benzylaminocyclohexane carboxamide, melting point 106–707° C.

Seventeen parts by weight of 1-benzylaminecyclohexane carboxamide are extracted over a period of 18 hours in a continuous extraction apparatus with a stirred suspension of 5.4 parts by weight of lithium aluminum hydride and 200 parts by volume of ether. The excess reagent is neutralized and 1-aminoethyl-1-benzylaminocyclohexane is distilled; boiling point/0.09 mm.=109–110° C. n 24° C.=1.5392. The dihydrochloride, obtained in the usual manner, melts after a leaching with ethyl acetate at 191–193° C.

*Example III*

To a cooled and stirred solution of 100 parts by volume of concentrated sulfuric acid is added dropwise 30 parts by weight of 1-methylaminocyclohexane carbonitrile. The mixture is heated and stirred for one hour at 100° C. and then poured into 1 kilogram of ice. The solution is neutralized with a concentrated solution of potassium hydroxide and the organic material is extracted with two 1-liter portions of ether and one 1-liter portion of chloroform. The extracts are combined and dried over sodium sulfate. After the removal of the drying agent and the solvents, a residue of 1-methylaminocyclohexane carboxamide remains; melting point 137–138° C. It is recrystallized from a 1:1 mixture of absolute ether and ethanol and sublimes readily without a change in melting point.

A stirred and refluxing suspension containing 15 parts by weight of lithium aluminum hydride and 1.1 parts by weight of ether is allowed to extract in a Soxhlet setup containing 31.4 parts by weight of 1-methylaminocyclohexane carboxamide. Following a reaction time of 2 days and neutralization of the excess reagent, 1-aminomethyl-1-methylaminocyclohexane is distilled. Boiling point 0.07 mm.=48–50° C. n 25° C.=1.4843. The dihydrochloride, obtained in the usual manner, melts at 245–247° C.

*Example IV*

A solution containing 7 parts by weight of 1-aminomethyl-1-methylaminocyclohexane and 25 parts by volume of ethylcarbonate is refluxed for 3 days. The excess reagent is removed under reduced pressure. The residue is taken up in ether and the ethereal solution is saturated with hydrogen chloride. The precipitate is filtered off and placed in a Soxhlet thimble. It is extracted with ethyl acetate for 16 hours. From the extract, white needles of 1-carbethoxyaminomethyl-1-methylamioncyclohexane hydrochloride crystallizes, melting point 203–205° C.

*Example V*

A solution containing 4.6 parts by weight of 1-aminomethyl-1-benzylaminocyclohexane and 25 parts by volume of ethyl carbonate is refluxed for 3 days. The excess reagent is removed under reduced pressure. The residue is taken up in ether and the ethereal solution is saturated with hydrogen chloride. The precipitate is filtered off and 1-carbethoxyaminomethyl-1-benzylaminocyclohexane hydrochloride is recrystallized directly from ethyl acetate, melting point 174–176° C.

What is claimed is:

1. A compound selected from the group consisting of those having the general formula:

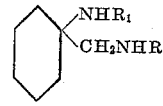

wherein R is a member of the group consisting of hydrogen and lower carbalkoxy and $R_1$ is a member of the group consisting of lower alkyl, phenyl, benzyl, beta-phenethyl, phenylpropyl, phenylbutyl, tolymethyl, 2,6-xylidyl and lower dialkylaminoalkyl, and therapeutically useful acid addition salts thereof.

2. Aminomethyl-lower dialkylaminoalkylamino cyclohexane.
3. Aminomethyl-lower alkylaminocyclohexane.
4. Lower carbalkoxyaminomethyl-lower alkylaminocyclohexane.
5. Lower carbalkoxyaminomethyl-benzylaminocyclohexane.
6. 1 - aminomethyl - 1-beta - diethylaminoethylaminocyclohexane.
7. 1-aminomethyl-1-benzylaminocyclohexane.
8. 1-aminomethyl-1-methylaminocyclohexane.
9. 1 - carbethoxyaminomethyl-1-methylaminocyclohexane.
10. 1-carbethoxyaminomethyl - 1 - benzylaminocyclohexane.
11. 1-carbethoxyaminomethyl - 1 - benzylaminocyclohexane hydrochloride.

References Cited in the file of this patent

UNITED STATES PATENTS

| 2,397,631 | Strain | Apr. 2, 1946 |
| 2,828,313 | Scholz et al. | Mar. 25, 1958 |

OTHER REFERENCES

"Organic Reactions," vol. VI, pp. 471, 479, 480 (1951), J. Wiley.

UNITED STATES PATENT OFFICE
CERTIFICATE OF CORRECTION

Patent No. 2,993,068

July 18, 1961

Edgar S. Schipper

It is hereby certified that error appears in the above numbered patent requiring correction and that the said Letters Patent should read as corrected below.

Column 2, line 12, for "hydroethanesulfonic" read -- hydroxyethansulfonic --; line 34, for "ilustrate" read -- illustrate --; same column 2, line 70, for "106-707° C." read -- 106-107° C. --; column 3, line 4, for "1-aminoethyl-" read -- 1-aminomethyl- --; column 4, line 20, for "tolymethyl" read -- tolylmethyl --.

Signed and sealed this 28th day of November 1961.

(SEAL)
Attest:

ERNEST W. SWIDER
Attesting Officer

DAVID L. LADD
Commissioner of Patents

USCOMM-DC